US012632458B2

(12) United States Patent
Marcus et al.

(10) Patent No.: US 12,632,458 B2
(45) Date of Patent: May 19, 2026

(54) SYSTEM AND METHOD FOR ANALYZING COMPUTERIZED DATA TRANSFERS USING PATTERN MINING

(71) Applicant: Actimize Ltd., Ra'anana (IL)

(72) Inventors: Yonit Marcus, Rehovot (IL); Gabrielle Azoulay, Bat Yam (IL); Danny Butvinik, Haifa (IL)

(73) Assignee: Actimize Ltd. (IL)

( * ) Notice: Subject to any disclaimer, the term of this patent is extended or adjusted under 35 U.S.C. 154(b) by 0 days.

(21) Appl. No.: 18/816,529

(22) Filed: Aug. 27, 2024

(65) Prior Publication Data
US 2026/0064703 A1     Mar. 5, 2026

(51) Int. Cl.
　　*G06F 16/2458*　　(2019.01)
　　*G06F 16/28*　　(2019.01)
(52) U.S. Cl.
　　CPC ........ *G06F 16/2465* (2019.01); *G06F 16/285* (2019.01)
(58) Field of Classification Search
　　CPC ........... G06Q 20/4016; G06Q 30/0225; G06Q 30/0248; G06Q 30/0185; G06F 16/2465; G06F 16/285; G06F 2216/03
　　USPC ........................................................ 707/776
　　See application file for complete search history.

(56) References Cited

U.S. PATENT DOCUMENTS

| | | | | |
|---|---|---|---|---|
| 9,954,879 B1* | 4/2018 | Sadaghiani | ......... | H04L 63/1416 |
| 2005/0080806 A1* | 4/2005 | Doganata | ............ | G06F 11/2257 |
| | | | | 707/999.102 |

| | | | | |
|---|---|---|---|---|
| 2010/0094791 A1* | 4/2010 | Miltonberger | ....... | G06Q 10/067 |
| | | | | 706/46 |
| 2013/0144825 A1* | 6/2013 | Ide | ........................... | G06N 5/02 |
| | | | | 706/46 |
| 2019/0340615 A1* | 11/2019 | Hanis | ....................... | G06N 5/02 |
| 2023/0145924 A1* | 5/2023 | Vijay | .................... | G06Q 20/12 |
| | | | | 705/44 |

OTHER PUBLICATIONS

Kim J, Jung H, Kim W. Sequential Pattern Mining Approach for Personalized Fraudulent Transaction Detection in Online Banking. Sustainability. 2022; 14(15):9791. https://doi.org/10.3390/su14159791 (Year: 2022).*

* cited by examiner

*Primary Examiner* — William P Bartlett

(57)　　　　ABSTRACT

A system and method for analyzing data transfers using pattern mining, including: categorizing sequences of events into categories based on an order of the events in the sequences; identifying, for one or more sequences in a given category, subsequences of events in a dataset of event data using one or more data mining algorithms; and accepting or denying a data transfer based on applying logical rules to the data transfer, where the rules may be determined using the identified subsequences. In some embodiments, event sequence categories may include an order sensitive category and an order insensitive category, and identifying one or more subsequences of events may include applying a first data mining algorithm to order sensitive sequences, and applying a second data mining algorithm to order insensitive sequences; rules may be determined based on calculating metrics for identified subsequences, describing occurrences of the subsequences in the dataset of event data.

17 Claims, 8 Drawing Sheets

Step 810: categorizing sequences of events into categories based on an order of the events in the sequences Step 820: for sequences in a given category, identifying, using one or more data mining algorithms, one or more subsequences in a dataset of event data Step 830: accepting or denying a data transfer based on applying logical rules to the data transfer, the rules determined using the identified subsequences Categorization of Event Sequences for Fraud Detection Scenarios Analysis by Order-Sensitivity and Event Type

| Category | Explanation | Example |
|---|---|---|
| Order-Sensitive Sequences | Sequences where the order of events significantly impacts the risk evaluation | • login→password_change→transfer<br>• profile_update→large_withdrawal |
| Order-Insensitive Sequences | Sequences where the order of events does not significantly impact the risk evaluation | • {login,balance_check, small_withdrawal}<br>• {location_change, device_change} |
| Mixed Order Sequences | Sequences containing both order-important and order-insensitive subsequences | • login→ {balance_check,profile_update}<br>→large_purchase<br>• {login,device_change}<br>→password_change->transfer |

Example transaction log where each transaction consists of multiple events:

| Transaction ID | Event ID | Timestamp | Event Type | Action |
|---|---|---|---|---|
| 1 | e1 | 2023-01-01 10:00:00 | Login | Start |
| 1 | e2 | 2023-01-01 10:01:00 | Login | Enter Credentials |
| 1 | e3 | 2023-01-01 10:02:00 | Login | Successful Login |
| 1 | e4 | 2023-01-01 10:05:00 | Account Settings | Change Password |
| 1 | e5 | 2023-01-01 10:10:00 | Transfer | High-Value Transfer |
| 2 | e6 | 2023-01-02 11:00:00 | Login | Start |
| 2 | e7 | 2023-01-02 11:01:00 | Login | Enter Credentials |
| 2 | e8 | 2023-01-02 11:02:00 | Login | Successful Login |
| 2 | e9 | 2023-01-02 11:15:00 | Withdrawal | Withdrawal |

604

Constructed Sequences within Transactions:

602A

Transaction 1:
Sequence: {Start, Enter Credentials, Successful Login, Change Password, High-Value Transfer}

602B

Transaction 2:
Sequence: {Start, Enter Credentials, Successful Login, Withdrawal}

FIG. 6

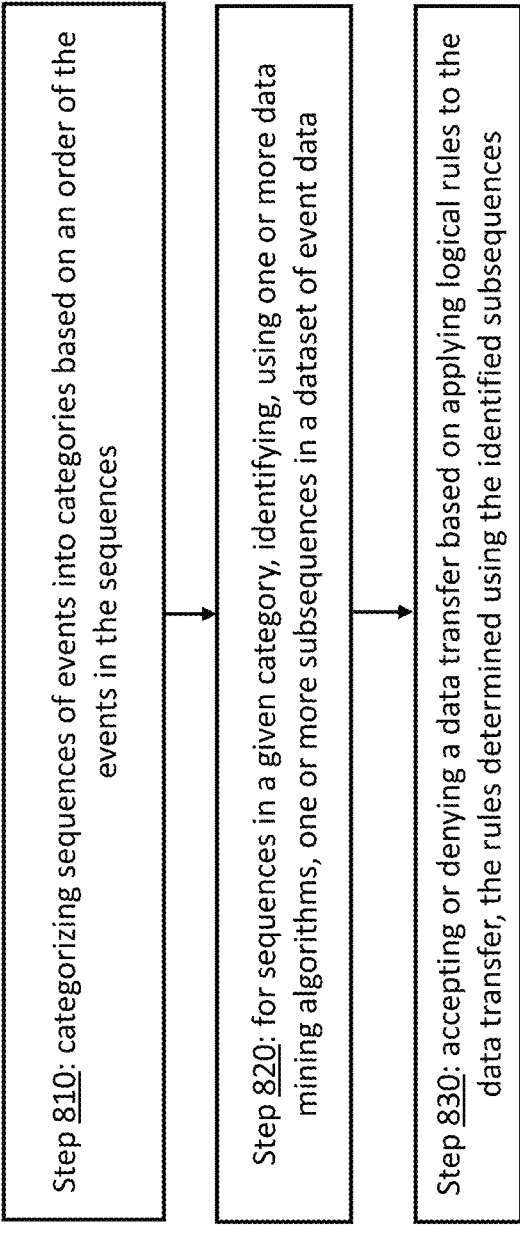

Step 810: categorizing sequences of events into categories based on an order of the events in the sequences Step 820: for sequences in a given category, identifying, using one or more data mining algorithms, one or more subsequences in a dataset of event data Step 830: accepting or denying a data transfer based on applying logical rules to the data transfer, the rules determined using the identified subsequences

FIG. 8

SYSTEM AND METHOD FOR ANALYZING COMPUTERIZED DATA TRANSFERS USING PATTERN MINING

FIELD OF THE INVENTION

The present invention relates to analyzing large volumes of data using pattern mining techniques.

BACKGROUND OF THE INVENTION

In the era of big data, analyzing large volumes of computerized event data has become crucial for extracting actionable insights across various domains such as, e.g., computerized financial crime detection, cybersecurity, healthcare, and more. Traditional data analysis methods often fall short in handling the complexity and scale of these massive datasets. Recent advances in pattern mining techniques and algorithms may enable the discovery of intricate patterns and associations within the data, which may be essential for uncovering hidden trends that may be used, for example, in optimizing computerized processes and/or for performing automated computerized actions based on insights drawn from large volumes of data (such as for example flagging a pending financial transaction as potentially fraudulent, or marking patient records as potentially indicative of risk-based on trends/insights drawn from large volumes of data which cannot, as a practical matter, be analyzed by a human).

The ability to efficiently and effectively mine hidden or latent patterns using large volumes of data may provide significant competitive advantages and drive innovation in various data-driven industries. There is a growing need for pattern mining technology solutions which may account for different kinds and types of input data, as well as for utilizing mined pattens in a robust manner, for example for making determinations and automatically performing appropriate computerized actions based on such patterns.

SUMMARY

Embodiments of the invention may provide a system and method for analyzing data transfers using advanced pattern mining techniques. Some embodiments may categorize sequences of events into categories based on an order of the events in the sequences; identify, for one or more sequences in a given category, subsequences of events in a dataset of event data using one or more data mining algorithms; and accept or deny a data transfer based on applying logical rules to the data transfer, where the rules may be determined using the identified subsequences.

In some embodiments, sequence categories may include an order sensitive category and an order insensitive category, and identifying one or more subsequences of events may include applying a first data mining algorithm to order sensitive sequences, and applying a second data mining algorithm to order insensitive sequences.

In some embodiments rules and automated actions may be determined based on calculating various metrics for identified subsequences, where the metrics may describe occurrences of the subsequences in the dataset of event data.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 3 shows example categories of sequences and example sequences according to some embodiments of the invention;

FIG. 6 illustrates an example sequence extraction process according to some embodiments of the invention;

FIG. 8 is a flow diagram describing an example method for analyzing data transfers using pattern mining according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention may be used to mine a large database of event sequences for itemsets or subsequences of interest, which may for example be recurring patterns within action sequences. Embodiments may generate or determine a plurality of logical rules based on mined itemsets or subsequences; calculate a plurality of score or metrics for the rules; select rules based on the metrics; and apply the rules to analyze data and perform automated computerized actions and/or send or transmit computerized data items over a communication or data network based on logical rule based analyses and assessments.

Some embodiments may take actions, e.g. transmitting data or controlling the transmission of data, based on mining and generating rules. Some embodiments of the invention may be used for mining and generating logical rules which may be used for computerized fraud detection based on a dataset of computer actions, which may describe a plurality of computerized actions, data transfers, or computerized transactions by a plurality of users. While some example embodiments discussed herein relate specifically to monetary fraud detection, different embodiments of the invention may be applied more generally to fields unrelated to finance or human activities. For example, some embodiments may be used to analyze and generate rules for detection of risky computer program executions, e.g., based on a database including a plurality of event log files—and/or for generating alerts based on analyzing data indicating risky computer program executions based on the generated rules. Similarly, while some example embodiments discuss accepting or rejecting a monetary transaction based on generated rules, other appropriate automated actions such as for example automatically terminating a computer program associated with risky patterns in .log data may be used in different embodiments. Example embodiments related to computerized fraud detection should therefore be considered nonlimiting.

Figure 1:
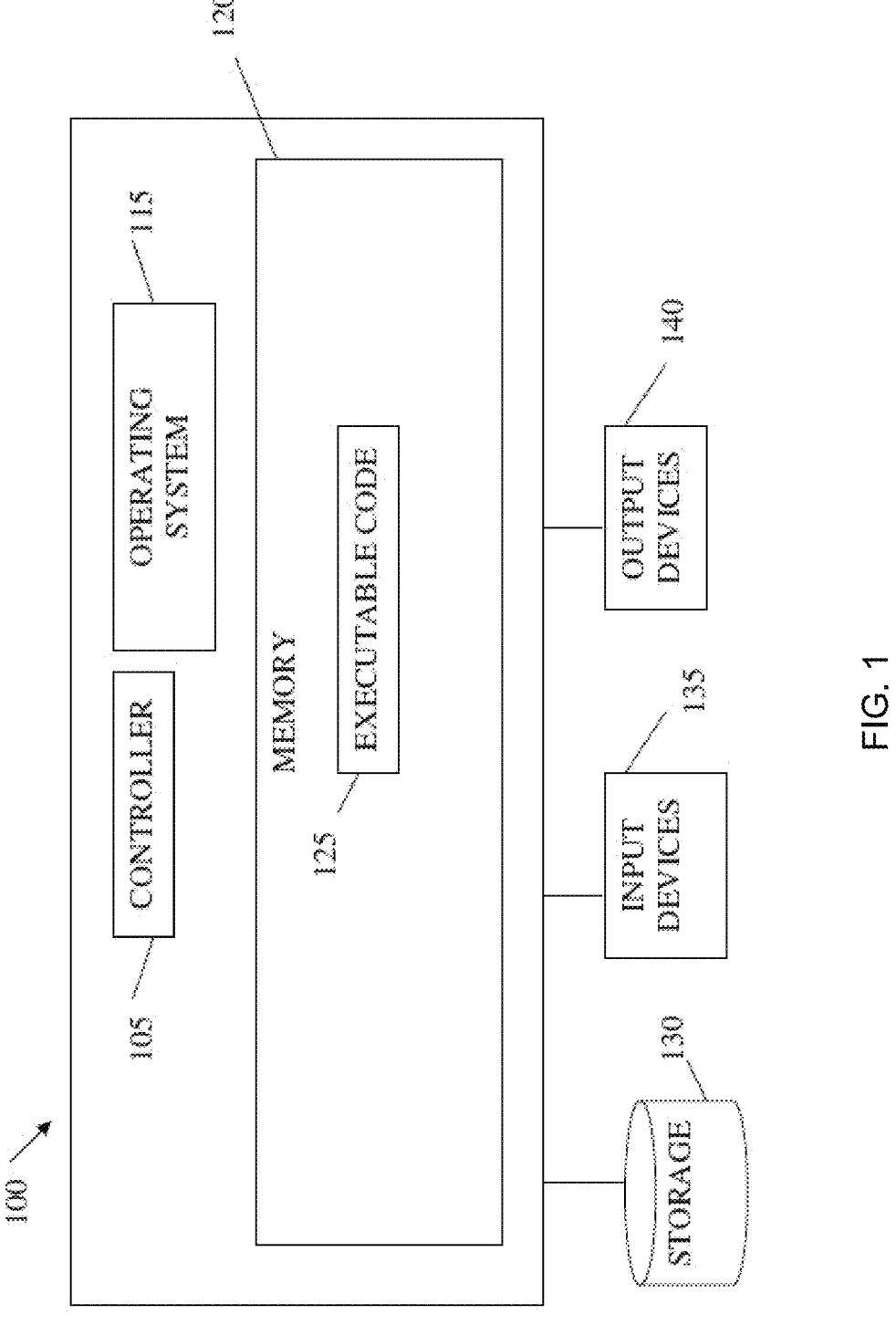
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

In some embodiments of the invention, at least one of the events comprises a computer action, the action performed over a communication network and recorded in the dataset of event data.

A computerized action, event, data transfer, or computerized transaction as used herein may refer to or may include sending computerized data items over a data or communication network, or input to a computer (with or without network activity). An action may include multiple of or a series of user inputs to a computer, such as keystrokes. For instance, a nonlimiting example action or event of "change password" may refer to sending or transmitting a computerized data item or items including a computerized request or command, to a remote computer system (as a nonlimiting example, a computerized system operated by a user may send a data item or request to update a password to a remote server maintaining a database or used credentials or password data). In some embodiments, computerized actions, events, or transactions may be recorded or documented in a database or databases of computer actions or events, such as for example illustrated in nonlimiting example Tables 1-2. Additional or alternative computerized actions may be considered using different embodiments of the invention.

Figure 2:
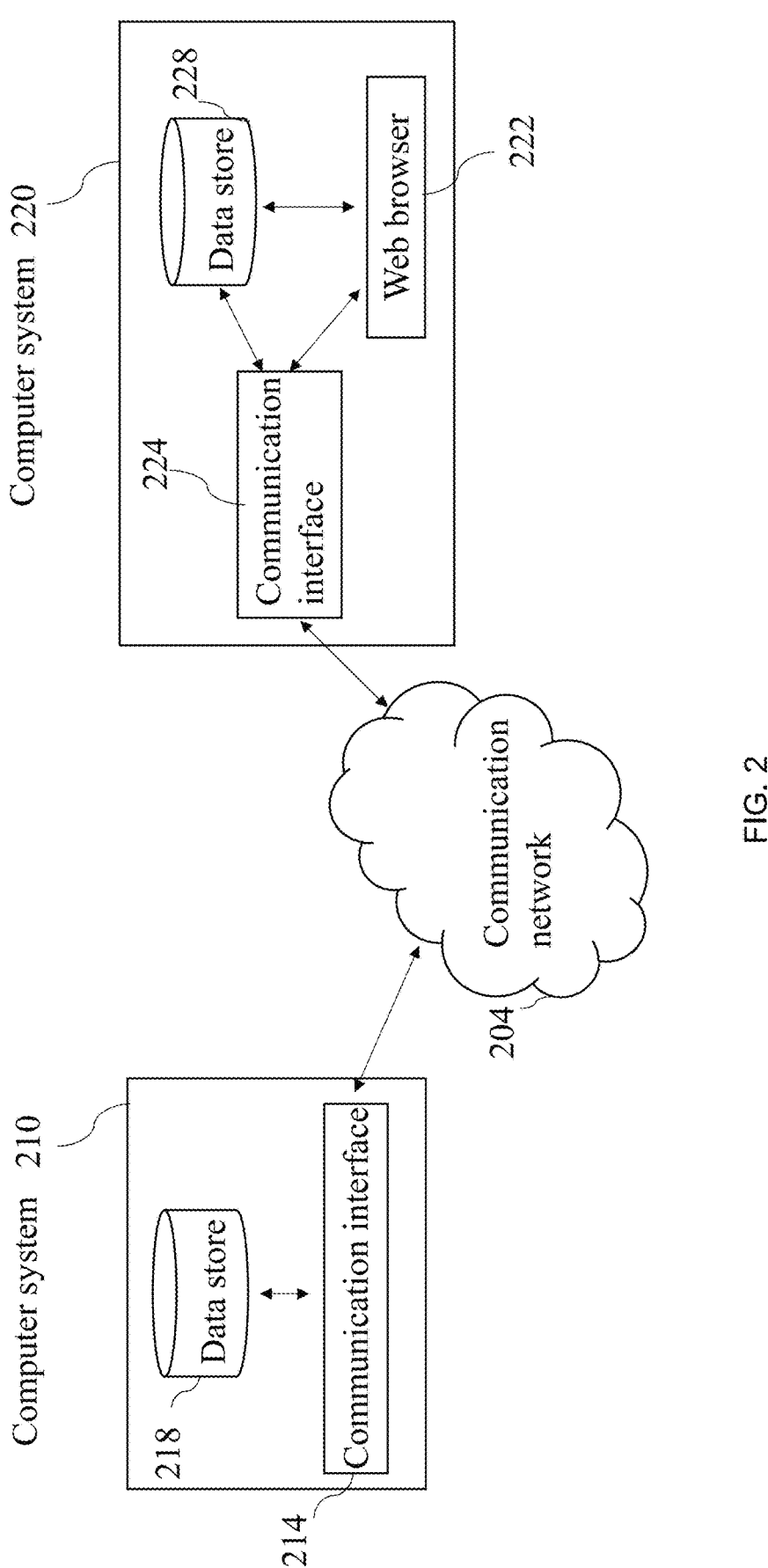
FIG. 2 shows example computer systems remotely connected by a data network according to some embodiments of the invention.

FIG. 2 shows example computer systems remotely connected by a data network according to some embodiments of the invention.

Some embodiments may include transmitting an alert to a remote computer over a communication network, the alert describing the data transfer.

Some embodiments of the invention may include performing an exchange of data or data transfer between remotely connected computer devices. For example, remote computer 210 may send or transmit, over communication or data network 204, computerized data items, data elements, or data points of information (as part of, e.g., computerized events and/or transactions which may be analyzed by some embodiments, as well as alerts describing or specifying data transfers or transactions suspected as involving fraud based on logical rules and/or metrics, computerized commands for performing automated computer actions such as accepting or denying a data transfer, and the like)—to computerized system 220, and/or vice versa. Each of systems 210 and 220 may be or may include the various components of system 100, as well as other computer systems, and include and/or operate or perform, e.g., the various corresponding protocols and procedures described herein. In some embodiments, computerized systems 210 and 220 may additionally perform operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

Computer systems 210 and 220 may communicate via data or communication or data network 204 via appropriate communication interfaces 214 and 224, respectively-which may be for example NICs or network adapters as known in the art. Computerized systems 210 and/or 220 may include data stores such as, e.g., 218 and 228 which may for example include a plurality of received data items, log files, rules, messages, requests, alerts, and the like, such as for example described herein. It is noted that in the context of the present description, systems 210 and/or 220 may be referred to for mere illustration purposes and in order to describe different computer systems in a given process or protocol. System 210 or 220 may not, therefore, designate a specific, singular computer system.

Some embodiments may record, collect, or document computerized actions or events in a computerized action/ event database or data store. For example, when a given computerized system (which may be, e.g., system 220 and may be operated by a user) is used to perform computer actions such as, e.g., a password change or login, embodiments may generate an event log entry that may include details such as the user ID, timestamp, IP address, and the type of action performed or event occurring. In some embodiments, actions or events may be collected using a computerized action tracking software, e.g., to collect or record low level or desktop actions such as for example clocking on a window on a display, typing, and the like. Recorded data may then be transmitted to a secure logging server (which may be, e.g., system 210), where it may be formatted into a structured log entry and stored in a dedicated database table. Additional or alternative techniques for recording computerized events or action data may be used in different embodiments.

Association rule learning as used herein may refer to a data mining technique that may be used to discover relationships, patterns, or associations among a set of items in a given dataset or datasets (which may for example be too large and/or complex for a person to analyze manually).

A rule such as an association rule or a strategic rule as used herein may refer to a logical rule or relationship identified between items or variables in a dataset. It may be expressed in the form of X→Y where X and Y may be events or sets of items having a correlation between them (which may be for example a statistical correlation). For example, the rule X→Y may suggest that the presence of an event X in a transaction implies the presence of an event Y with a certain level or degree of statistical certainty (for example, event Y follows event X in 90% of the instances where event X appears). In some embodiments of the invention, association rules may help in discovering and monitoring patterns in data, and for making automated decisions and performing automated computerized actions according to discovered or monitored patterns.

Some example embodiments may generate rules based on computer actions, data transfers, or computerized transaction data. For example, based on a dataset or datasets of computer action sequences (such as for example illustrated in Tables 1-2) some embodiments may use data or pattern mining procedures and techniques to determine or generate the example logical rule or association rule such as: (large cash withdrawal)→(change password). The rule may then be applied to incoming data-such as for example newly performed computerized actions, data transfers, or computerized transactions, and if a password change operation is found to follow a large cash withdrawal, some embodiments may perform an example automated action such as for example blocking the account used for performing the relevant actions or transfers. Additional or alternative examples for association rules and their application may be used in different embodiments.

Association rule learning may be used in some embodiments to uncover relationships between events by identifying interesting patterns, correlations, or associations among a set of items in input data (such as for example data transfer or transaction data).

As part of determining association rules, some embodiments of the invention may calculate various metrics describing correlations between event data—as may be reflected, e.g., in event sequences or subsequences in a dataset of event data. In some embodiments, example metrics or scores may be calculated as part of data or pattern mining algorithms applied to event or event sequence data.

An antecedent as referred to herein may be an initial action, event or itemset in an association rule. It may be an "if" part of the rule. For instance, in the nonlimiting example rule: "if a large withdrawal occurs, then an international transfer follows", or (large withdrawal)→(international transfer), the large withdrawal may be considered as the antecedent. A consequent as referred to herein may be the event or itemset that occurs as a result of the antecedent. It may be the "then" part of the rule. In the aforementioned rule, the international transfer may be the consequent.

Understanding relationships between antecedents and consequents may be vital in many fields and applications, e.g., in financial crime detection, where identifying suspicious sequences of event or transactions may help prevent fraud.

In some embodiments, the one or more logical rules are determined based on a correlation between a first event in a subsequence and a second event in a subsequence, the correlation calculated using the dataset of event data.

Support according to some embodiments may be a metric or measure describing how frequently the items (e.g., a first operation or antecedent A and a second operation or consequent B) in an association rule, subsequence or pattern appear together in the dataset (and may therefore be correlated in the dataset). It may be calculated as the proportion of transactions in the dataset that contain both the antecedent and the consequent. For example, for an antecedent A and a consequent B:

$$\text{Support}(A \to B) = \qquad\qquad\qquad\qquad\qquad \text{(eq. 1)}$$

$$\text{Number of events or transactions containing both } A \text{ and } B/$$

$$\text{Total number of transactions}$$

Support may help to identify rules that are common in the dataset. For example, in financial crime detection, a high support value for a rule involving a sequence of suspicious transactions may indicate a widespread pattern of behavior, or a correlation between events that may warrant further investigation.

Confidence according to some embodiments may be a measure or metric describing a reliability of a rule or correlation. It may be calculated as the proportion of events or transactions containing the antecedent that also contain the consequent (and may be therefore be indicative of a correlation between the antecedent and the consequent). For example:

$$\text{Confidence}(A \to B) = \qquad \text{(eq. 2)}$$

$$\frac{\text{Number of transactions containing both } A \text{ and } B}{\text{Number of transactions containing } A}$$

Confidence may indicate the likelihood that the consequent will occur when the antecedent is present. A high confidence value for a rule may suggest that whenever the antecedent (e.g., a large withdrawal) occurs, the consequent (e.g., an international transfer) is very likely to follow, which may in some example use cases highlight a potentially risky pattern.

Lift according to some embodiments may be a measure or metrics describing how much more likely the consequent (or second event/action) may be given the antecedent (or first event/action), compared to the likelihood of the consequent occurring in the general population or samples in a dataset, e.g., in the presence and in the absence of the antecedent (this metric or measure may accordingly be indicative of a statistical/probabilistic correlation between the antecedent and the consequent). It may be the ratio of the observed support to that expected if the antecedent and consequent were independent. For example:

$$\text{Lift}(A \to B) = \text{Support}(A \to B)/\text{Support}(B) \qquad \text{(eq. 3)}$$

A lift value greater than 1 may indicate a positive correlation between the antecedent and consequent; they may be more likely to occur together than alone, or by chance. In the nonlimiting example of financial crime detection, a high lift value may suggest that the occurrence of the antecedent significantly increases the likelihood of the consequent, thus indicating a strong association or correlation that may be indicative of fraudulent activity.

In some embodiments, lift may be used to compare the observed co-occurrence of the antecedent and consequent with their expected co-occurrence if they were independent, and may indicates how much more likely the consequent is to occur given the antecedent, compared to it occurring, e.g., by chance.

In some embodiments, the correlation is calculated using a ratio between a number of the sequences including the first event and the second event, and a number of sequences including only the first event multiplied by the number of sequences including only the second event.

For example, in some embodiments, lift may be calculated using a plurality of formulas, including, for example:

$$\text{Lift}(A \to B) = \text{Support}(A \cup B)/\text{Support}(A) \times \text{Support}(B) \qquad \text{(eq. 4)}$$

Where:

Support (AUB) may be the support of the rule, i.e., the proportion of data items or transactions that contain both the first event or antecedent A and second event or consequent B; Support (A) may be the support of the antecedent A, i.e., the proportion of data items or transactions that contain A; and Support (B) Support (B) may be the support of the consequent B, i.e., the proportion of data items or transactions that contain B.

For example, considering a nonlimiting example dataset of transactions in a supermarket, and the rule:

$$(A \to B) \qquad \text{(eq. 5)}$$

(or: if a customer buys bread (A), they also buy butter (B))

Suppose the dataset has 1,000 transactions; that bread is bought in 100 transactions: Support (A)=100/1000=0.1; that butter is bought in 150 transactions: Support (B)=150/1000-0.15; and t that both bread and butter are bought together in 80 transactions: Support (AUB)=80/1000–0.08. Then the corresponding life value may be, e.g., Lift=0.080.1× 0.15=0.080.015=5.33.

A lift value of 5.33 may indicate, for example, that customers who buy bread are 5.33 times more likely to buy butter compared to the probability of buying butter by chance. Some nonlimiting example indications based on lift values or ranges may be, e.g.:

Lift>1: may indicate a positive association, meaning that the antecedent and consequent occur together more often than expected by chance.

Lift=1: may indicate no association, meaning that the antecedent and consequent occur together as often as expected by chance.

Lift<1: may indicate a negative association, meaning that the antecedent and consequent occur together less often than expected by chance.

In the above example, a lift value of 5.33 may suggest a strong positive association between buying bread and buying butter, which can be valuable information, e.g., for marketing strategies and store layout planning.

In some embodiments of the invention, event data and/or sequences or events may be categorized into a plurality of categories.

FIG. 3 shows example categories of sequences and example sequences according to some embodiments of the invention.

Some nonlimiting example sequence types according to some embodiments are provided with nonlimiting example real-world scenarios and corresponding metrics or parameters. Additional or alternative sequence types and/or corresponding examples may be included or considered in different embodiments.

Order-Sensitive Sequences/Category 302

Explanation: Sequences where the temporal order of events may, for example, be crucial for determining a risk score for the sequence, or may indicate a higher fraud risk (which may be the risk or probability that a given sequence is associated with fraudulent activity, e.g., based on data describing past events and for example according to scores or metric values such as, e.g., demonstrated herein).

Nonlimiting example sequence 304: login→password-_change→transfer

Support(S): Frequency of the entire sequence in the dataset.

Confidence (C): Likelihood of the transfer following the password change.

This nonlimiting example order sensitive sequence may not be considered equivalent to a sequence such as, e.g. login→transfer→password_change, where the order of operations is different.

Order-Insensitive Sequences/Category 306

Explanation: Sequences where the order of events may not impact the risk score (or may not have a significant impact on the risk score or on the fraud risk of the sequence). The presence of the events, irrespective of their order, may be equally important.

Nonlimiting example sequence 308: {login, balance-_check, small_withdrawal}

Support(S): Frequency of the set of events in the dataset.

Confidence (C): Likelihood of the events occurring together.

A nonlimiting example order sensitive sequence of log-in→balance_check→small_withdrawal may considered equivalent to a sequence such as, e.g. login→small_withdrawal balance_check, where the order of operations is different.

Mixed-Order Sequences/Category 310

Explanation: Sequences that may contain both order-important and order-insensitive sequences.

Nonlimiting example: login→{balance_check, profile_update}→large_purchase

Support(S): Frequency of the overall sequence.

Confidence (C): Likelihood of the large purchase following the mixed-order subsequence.

In this nonlimiting example sequence, operations within curly brackets may be executed in different orders without impacting a risk score or fraud risk attributed the overall sequence of events.

Antecedent-focused sequences may be sequences where events of interest may be those leading up to a particular antecedent. This focus may help identify precursors or triggers of certain actions, providing insights into preventative measures. For example, in financial crime detection, examining or searching for relevant antecedent-focused sequences may reveal a pattern of smaller withdrawals leading up to a large withdrawal, which could indicate an attempt to avoid detection thresholds.

Antecedent-Focused Sequences

Explanation: Sequences where events may lead up to a critical event (labeled using square brackets).

Nonlimiting example: failed_login→[password_change] →login

Support(S): Frequency of the antecedent-focused sequence.

Confidence (C): Likelihood of successful login following the antecedent event.

Consequent-focused sequences may be sequences where event of interest may be the outcomes following a particular consequent and may relate to the impact and subsequent actions following an event. For example, in financial crime detection, nonlimiting example consequent-focused sequences may include the series of actions taken after an international transfer, such as rapid withdrawals from multiple locations, which may suggest, e.g., a coordinated effort to launder money. Additional or alternative sequence types or categories may be defined and/or used in different embodiments.

Consequent-Focused Sequences

Explanation: Sequences where events may follow or be a consequent of a critical event (labeled using square brackets).

Nonlimiting example: [transfer]→balance_check→login-_from_new_location

Support(S): Frequency of the consequent-focused sequence.

Confidence (C): Likelihood of subsequent events following the transfer.

Additional or alternative nonlimiting example sequences and sequence categories may be considered using different embodiments of the invention.

Figure 4:
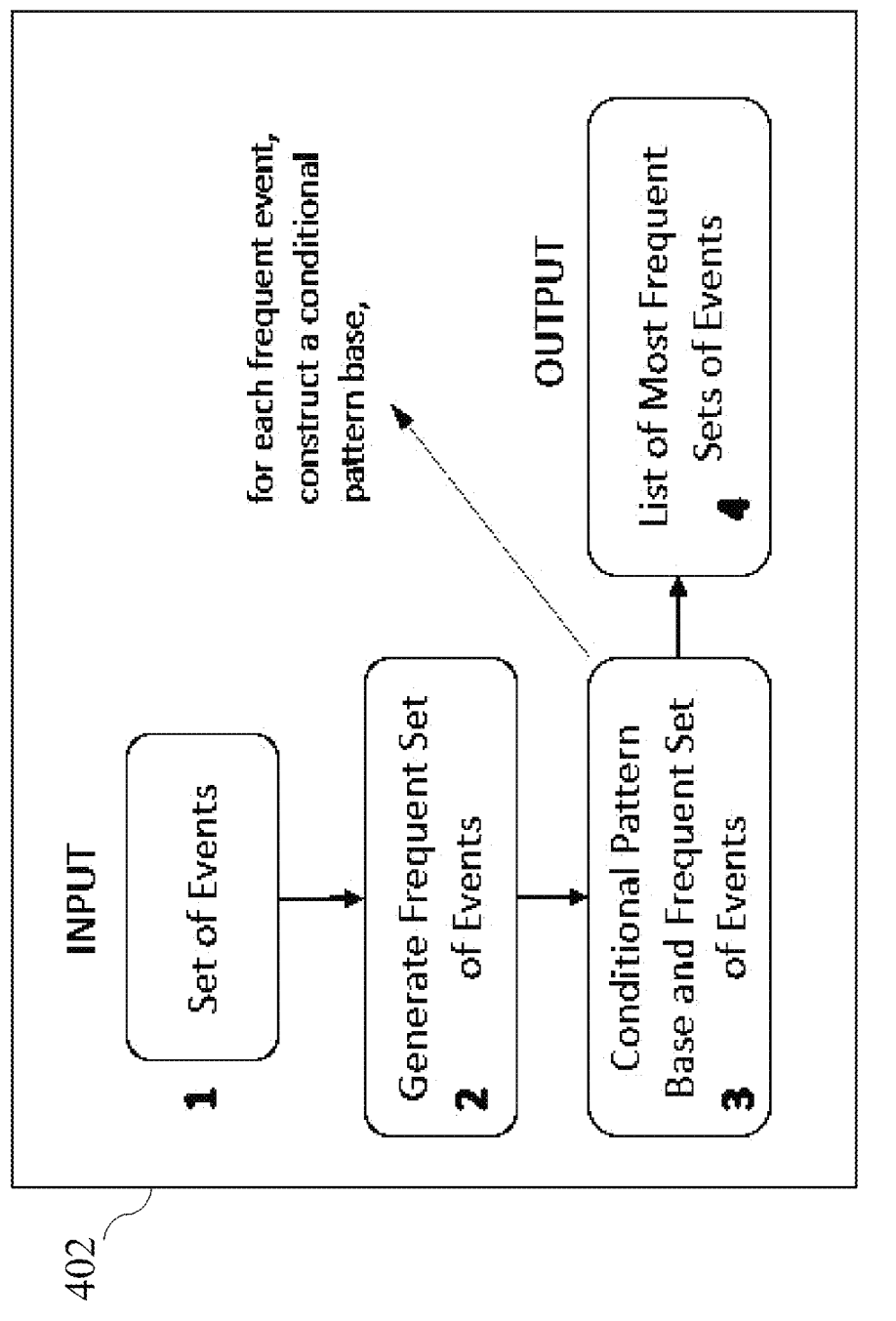
FIG. 4 shows an example frequent pattern growth (FP-Growth) algorithm according to some embodiments of the invention.

FIG. 4 shows an example frequent pattern growth (FP-Growth) algorithm according to some embodiments of the invention.

Some embodiments of the invention may include a mining algorithm such as for example an FP-Growth (Frequent Pattern Growth) algorithm 402 for mining frequent itemsets (which may be, for example, subsequences of computerized events or actions mined based on a dataset of events or event sequences). According to some embodiments, an FP-Growth algorithm may construct a compact data structure called the FP-tree (Frequent Pattern Tree) to represent the dataset and may recursively mine the tree to identify, determine or generate frequent patterns, sequences or subsequences within the input dataset. In some embodiments, the FP-Growth algorithm may identify frequent sequential patterns or subsequences within, e.g., historical computerized action or event data, as documented in a corresponding dataset. By analyzing these patterns, the algorithm may determine combinations or subsequences of events that occur frequently, e.g., before data transfers or transactions suspected as fraudulent. According to some embodiments, FP-Growth may be highly efficient in handling large datasets and may identify patterns without the need for multiple database scans.

Figure 5:
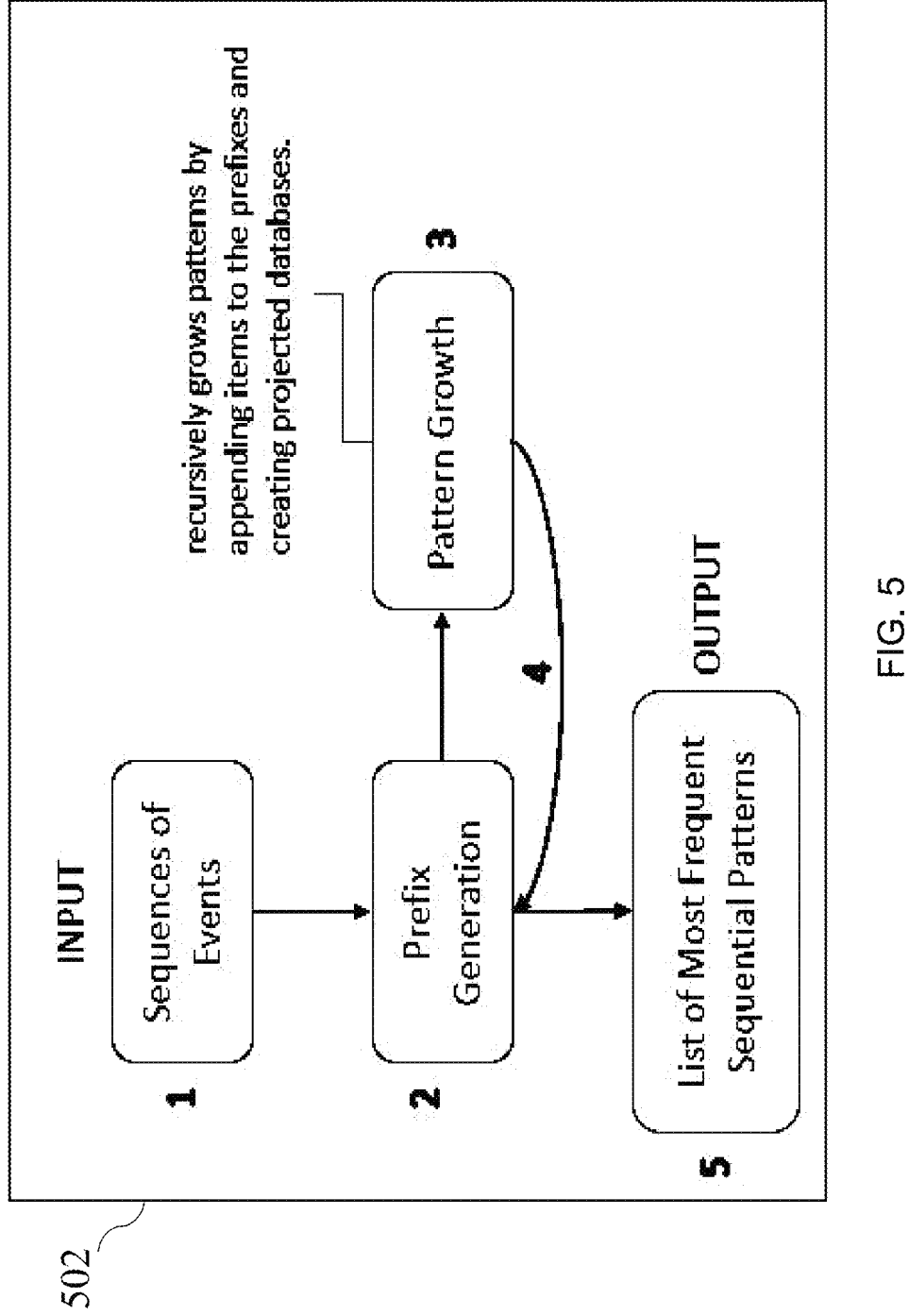
FIG. 5 shows an example PrefixSpan algorithm according to some embodiments of the invention.

FIG. 5 shows an example PrefixSpan algorithm according to some embodiments of the invention.

Some embodiments of the invention may include a pattern mining algorithm such as for example a PrefixSpan (Prefix-projected Sequential Pattern Mining) algorithm 502, which may mine a dataset or pool of sequential patterns, for example by exploring prefix-projected databases. A PrefixSpan algorithm according to some embodiments may generate candidate sequences by recursively projecting the database based on the prefixes of the sequences. In some embodiments, the PrefixSpan algorithm may uncover sequential patterns that indicate, e.g., risky events or behavior. By examining the order of events and their temporal relationships, the PrefixSpan algorithm may identify subtle patterns that traditional methods may overlook. A PrefixSpan according to some embodiments may be particularly effective in identifying long sequential patterns and capturing temporal orders of events.

In some embodiments, a single data transfer or transaction may contain a plurality or sequence of events. This may happen, e.g., if a transaction involves multiple steps or actions. For example, a single login session may involve several events such as authentication, password change, and a high-value transfer, which may be considered as part of a single transaction event or sequence of events.

Nonlimiting examples for sets of events within individual transactions may be, e.g.:

Transaction 1 Sequence: {Start, Enter Credentials, Successful Login, Change Password, High-Value Transfer}

Transaction 2 Sequence: {Start, Enter Credentials, Successful Login, Withdrawal}

A nonlimiting example computerized event, data transfer, or transaction database which may be used in some embodiments of the invention is provided in Table 1:

TABLE 1

| Trans-action ID | Event ID | Timestamp | Event Type | Action |
|---|---|---|---|---|
| 1 | e1 | 2023-01-01 10:00:00 | Login | Start |
| 1 | e2 | 2023-01-01 10:01:00 | Login | Enter Credentials |
| 1 | e3 | 2023-01-01 10:02:00 | Login | Successful Login |
| 1 | e4 | 2023-01-01 10:05:00 | Account Settings | Change Password |

TABLE 1-continued

| Trans-action ID | Event ID | Timestamp | Event Type | Action |
|---|---|---|---|---|
| 1 | e5 | 2023-01-01 10:10:00 | Transfer | High-Value Transfer |
| 2 | e6 | 2023-01-02 11:00:00 | Login | Start |
| 2 | e7 | 2023-01-02 11:01:00 | Login | Enter Credentials |
| 2 | e8 | 2023-01-02 11:02:00 | Login | Successful Login |
| 2 | e9 | 2023-01-02 11:15:00 | Withdrawal | Withdrawal |

It should be noted that various data structures and database formats may be used in different embodiments of the invention.

Some embodiments may mine and analyze or make determinations using sequences of events that occur across, e.g., multiple transactions over time. Nonlimiting example sequences may be, e.g.:

Transaction 1 Sequence: {Start-Enter Credentials→Successful Login→Change Password→High-Value Transfer}

Transaction 2: Sequence: {Start→Enter Credentials-→Successful Login→Withdrawal}

Where it may be seen that both sequences include a subsequence of {Start→Enter Credentials→Successful Login}.

Some embodiments may mine, analyze and/or make determination based on, e.g., events or sequences across transactions by a single user within a given time period (e.g., of 10 minutes), such as for example provided in the nonlimiting example event, data transfer, or computerized transaction dataset of Table 2:

TABLE 2

| Transaction ID | Timestamp | Transaction Type | Action |
|---|---|---|---|
| 1 | 2023-01-01 10:00:00 | Transfer | Login |
| 1 | 2023-01-01 10:01:00 | Transfer | Change Password |
| 1 | 2023-01-01 10:02:00 | Transfer | High-value Transfer |
| 1 | 2023-01-01 10:05:00 | Withdrawal | Login |
| 1 | 2023-01-01 10:10:00 | Withdrawal | Withdrawal |

Reference is made to FIG. 6, which illustrates an example sequence extraction process according to some embodiments of the invention.

Some embodiments may apply pattern mining algorithms, e.g., to event or event sequence data describing or corresponding to sequences of individual data transfers or transactions and/or from events across data transfers or transactions, which may enable identifying or determining patterns or subsequences that span both individual transaction steps and subsequences appearing across transactions. According to some embodiments, events within or across data transfers or transactions may include or may be multiple steps or computerized actions. For example, a transaction or data transfer may involve several events such as authentication, password change, and a high-value transfer (which may take place, for example, in a singe login session by a user operating a computer system). Some example transactions 602A-B may be documented, extracted, or constructed based on data or information items such as, e.g., event or computer action log file or dataset 604 (which may include various fields such as a transaction or event identifiers or IDs, timestamp information, event type, and a computer action included in the event (such as for example entering text such as for example credentials by user operating a computer device, and the like). Various techniques and protocol for creating event or computer action logs may be used in different embodiments.

It should be noted that various event data formats, as well as protocols and procedures for identifying or determining or extracting patterns based on data transfer events, may be used in different embodiments of the invention.

Figure 7:
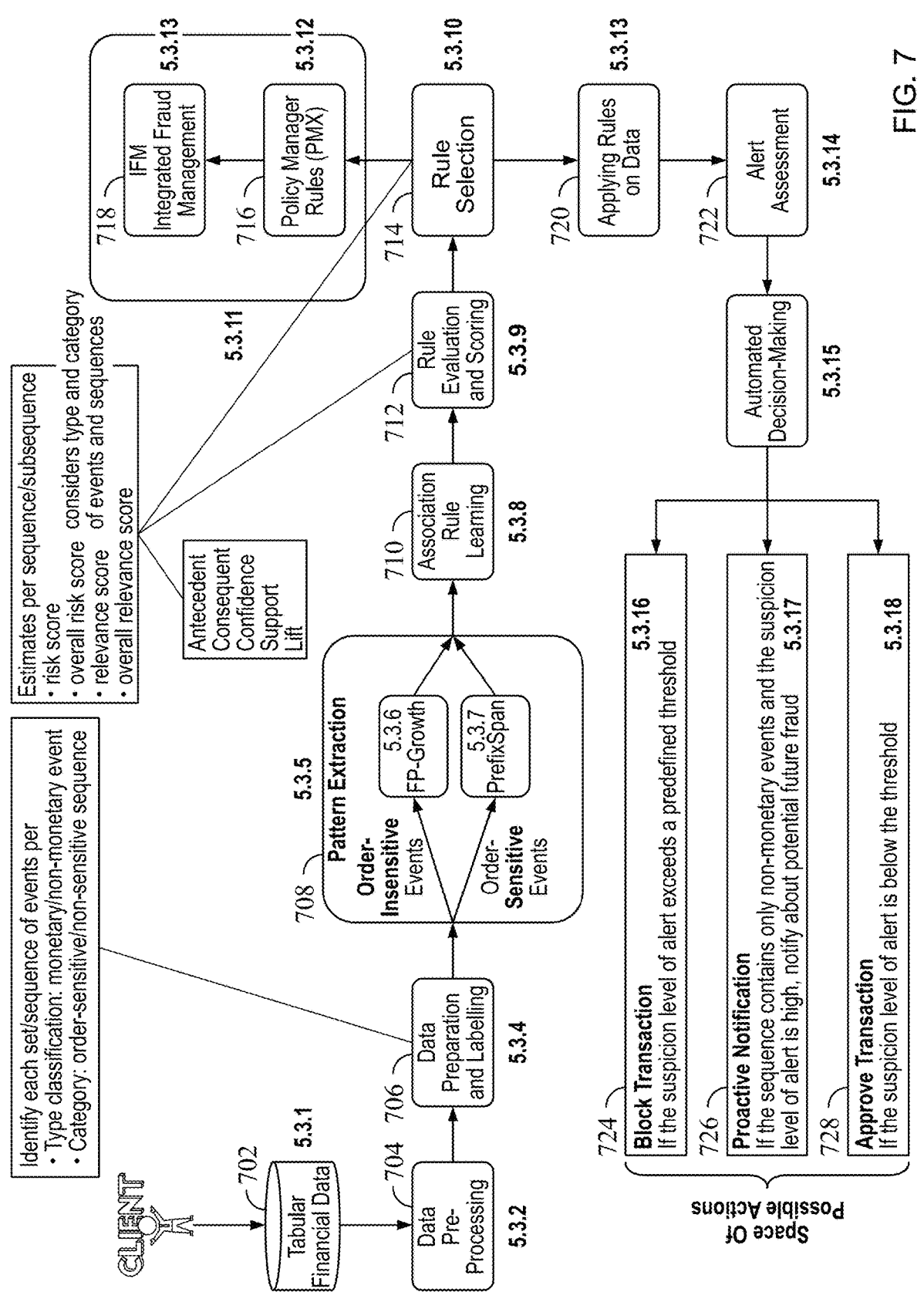
FIG. 7 shows an example process for computerized fraud detection according to some embodiments of the invention.

FIG. 7 shows an example process for computerized fraud detection according to some embodiments of the invention.

The process may begin with receiving input data-such as for example a computerized event or transaction dataset of tabular data 702 (such as for example financial transaction data and/or event data as in Tables 1-2 and/or in FIG. 6)—which may then be subjected to a data pre-processing step or phase 704 to clean and organize the information for further analysis. Various pre-processing and cleaning operations may be used in different embodiments.

Component 5.3.4 data preparation and labeling 706. The output of this component may be a comprehensive labeled dataset of event data or of computer operation data, where each event and sequence of events is classified and categorized. This labeled data may then be used in subsequent steps, e.g., pattern or subsequence extraction, association rule determination and/or evaluation, decision-making processes, and the like, such as for example described herein. According to some embodiments, a labeled dataset may include event or action log data, which may be labeled automatically (e.g., based on predetermined settings, conditions, or criteria) or manually (e.g., by a system administrator, user, or subject matter expert (SME)). For example, an event sequences, data transfers, or transactions such as, e.g., {Password_Change, Add_New_Beneficiary, Self Transfer, Domestic_Transfer} may be labeled as "legit" or not suspected as fraudulent (for example as a default, predetermined label), and a sequence such as, e.g., {Password_Change, Adress_Change, International_Transfer, Domestic_Transfer} may be labeled as "fraud" or as potentially fraudulent (such as for example according to a predetermined condition requiring that event sequences including a monetary transfer event having a timestamp of less than 5 seconds away from a timestamp of an address change event are labeled as potentially fraudulent). Additional or alternative techniques and procedures for labeling sequences, data transfers or transactions may be used in different embodiments.

Some embodiments of the invention may include categorizing one or more sequences of events into one or more categories, the categorizing based on an order of the events in one or more of the sequences. In some embodiments, the one or more categories include an order sensitive category and an order insensitive category.

In some embodiments of the invention, a data preparation and labeling procedure may include, e.g.:

Data cleaning and normalization, which may include for example removing any inconsistencies, missing values, and errors from the input data. Normalization may ensure, e.g., that the data is in a consistent format, which is crucial for accurate analysis. In some embodiments, each event or computer operation in the dataset may be classified or categorized based on its type, such as for example as including monetary or non-monetary events. According to some embodiments, event categorization may be performed automatically (e.g., according to predetermined settings, conditions, or criteria—for example requiring that an event including or involving a monetary value is to be classified as a monetary event—and/or for example using machine learning or neural network based classification techniques using features or attributes of event or action data) or manually (e.g., according to definitions or settings by a system administrator or SME). Sequence categorization, in which events or computer operations may be grouped into sequences, and these sequences may be grouped or categorized based on their order-sensitivity. Order-sensitive sequences may be sequences where the order of events may be of importance, while order-insensitive sequences may not depend on the sequence order. This categorization or grouping may be achieved, for example, using sequence analysis techniques, such as sequential pattern mining, which identifies patterns in the order of events. In some embodiments, sequence categorization may include, for example, generating a plurality of permutations or variations (such as, e.g., all possible permutations of an event sequence) for a given sequence, and calculating metrics or consider parameters such as a risk score or classification, a lift value, and the like, for generated permutations. A sequence may then be classified as, e.g., order sensitive or order insensitive based on parameter or metric values calculated for its permutations. For example, given a sequence {Adress_Change, International_Transfer, Domestic_Transfer}, embodiments may generate 3*2=6 permutations (including the original sequence, counted as a single permutation) such as, e.g.: {Adress-_Change, Domestic_Transfer, International_Transfer}, {International_Transfer, Adress_Change, Domestic-_Transfer}, {International_Transfer, Domestic_Transfer, Adress_Change}, {Domestic_Transfer, Adress-_Change, International_Transfer}, and {Domestic_Transfer, International_Transfer, Adress-_Change}. Some embodiments may calculate risk and/or lift scores or values for all generated permutations (e.g., using a dataset of event or action data), and if values for at least two different permutation differ by more than a predetermined value or threshold (e.g., Risk(2–Risk(1)>0.5 and/or Lift(2)–Lift(1)>0.5), then some embodiments may categorize the given sequence as order sensitive. Otherwise the sequence may be categorized as order insensitive. Additional or alternative procedures or sequence categorization using event labels, scores, metrics, and the like, may be used in different embodiments.

According to some embodiments action or event classification and/or sequence categorization or grouping processes may use machine learning techniques, such as supervised learning algorithms, where a model is trained on a labeled dataset to recognize and categorize different types of events or sequences. Features such as for example transaction amount, transaction type, and account details may be used to train the model. The categorization step may consider factors like the time intervals between events, the types of events involved, and their chronological order.

Additional, labeling, where each event and sequence may be labeled with relevant information such as risk score, relevance score, and/or other attributes, which may also be performed for example using machine learning or neural network classification techniques.

Techniques used for classification and categorization according to some embodiments may involve advanced machine learning models and algorithms that may consider various attributes of the events and their sequences, which may be used to analyze the data to identify patterns and relationships that are indicative of fraudulent activities.

Component 5.3.5 pattern extraction 708 and component 5.3.8 association rule learning 710

A pre-processed labeled dataset constructed or generated in component 706 may enter or may be used in a pattern mining step or stage, utilizing appropriate algorithms such as for example the FP-Growth and PrefixSpan algorithms to uncover significant patterns and sequences of events (such as, e.g., transactions). Patterns identified by some embodiments may undergo evaluation and scoring, for example to determine their relevance and/or potential risk levels. Rules may be further derived from these patterns, which may be applied, e.g., to evaluate or assess alerts generated using the data. The system may then perform automated actions or decision-making actions based on the scores, suspicion or risk levels determined or calculated for these alerts. For example, depending on the evaluated risk, actions such as blocking transactions, sending proactive notifications about potential future fraud, or approving transactions may be executed.

According to some embodiments, a pattern or data mining or extraction process may begin with ingesting pre-processed tabular financial data to be analyzed (e.g., a labeled dataset of event sequences, computer operation data, or transaction data). Some embodiments may then mine subsequences and subsets of events, e.g., within individual transactions and across multiple transactions (for example over a given time period). By identifying combined sequences and mixed sequences, the system may provide a comprehensive analysis of user behavior.

Once the data is ingested, embodiments may classify each set and sequence of events. It may, e.g., differentiate between monetary and non-monetary events and categorize patterns based on their sensitivity to the order of events, distinguishing between order-sensitive and order-insensitive sequences (see corresponding description herein). Embodiments may then apply one or more subsequence or pattern extraction or mining algorithm to events in different categories or groups, to determine association or logical rules that may be used in subsequent steps. A scoring mechanism may calculate risk and relevance scores for rules, sequences or subsequences, considering, e.g., the type and category of events, as well as metrics or properties such as antecedent, consequent, confidence, support, and lift. Rules may be selected and applied based on calculated scores or metrics. Embodiments may provide a dual-level analysis, mining patterns within individual transactions and/or across multiple transactions over time. This approach may result in a vast space of events, directions, and combinations, providing a comprehensive view of the data being analyzed.

Some embodiments may include, for one or more sequences in a given category, identifying, using one or more data mining algorithms, one or more subsequences of events in a dataset of event data. In some embodiments, events or event sequences of different categories may be provided as inputs to corresponding data mining algorithms. In some embodiments, identifying one or more subsequences of events comprises applying a first data mining algorithm to the sequences in the order sensitive category, and applying a second data mining algorithm to the sequences in the order insensitive category.

For example, in some embodiments of the invention, the FP-Growth algorithm may be applied to or used for a category or group of order insensitive sequences, and the PrefixSpan algorithm may be applied to or used for a category or group of order sensitive sequences. Additional or alternative machine learning and/or pattern mining algorithms appropriate for different categories of sequences or event data may be used in different embodiments.

From Association Rules Algorithm To Rule Generation: according to some embodiments, a pattern mining and association rules generation algorithm may include, for example:

Step 1: identifying or determining frequent itemsets, subsequences, patterns, or events using, e.g. the FP-Growth data mining algorithm. Assume there exists a dataset of event sequences or transactions T with the following sequences or events:

$$T1: \{large\_withdrawal, international\_transfer, high\_risk\_country\} \quad (eq.\ 6)$$

$$T2: \{large\_withdrawal, high\_risk\_country\}$$

$$T3: \{international\_transfer, high\_risk\_country\}$$

$$T4: \{large\_withdrawal, international\_transfer\}$$

$$T5: \{large\_withdrawal, international\_transfer, high\_risk\_country\}$$

Using, e.g., FP-Growth, some embodiments may calculate support values for itemsets or subsequences, and determine frequent itemsets or subsequences using support values, which may for example be subsequences included in sequences T1-T5, such as e.g:

$$\{large\_withdrawal, high\_risk\_country\} \text{ with support } 3/5 = 0.6$$

$$\{international\_transfer, high\_risk\_country\} \text{ with support } 3/5 = 0.6$$

$$\{large\_withdrawal, international\_transfer\} \text{ with support } 3/5 = 0.6$$

$$\{large\_withdrawal, international\_transfer, high\_risk\_country\} \text{ with support } 2/5 = 0.4$$

Step 2: generating candidate rules. From the frequent example itemset or subsequence {large_withdrawal, international_transfer, high_risk_country}, some embodiments may generate or determine candidate rules, such as, e.g.:

$$large\_withdrawal \rightarrow international\_transfer \quad (eq.\ 8)$$

$$large\_withdrawal \rightarrow high\_risk\_country$$

$$international\_transfer \rightarrow high\_risk\_country$$

$$large\_withdrawal, high\_risk\_country \rightarrow international\_transfer$$

$$international\_transfer, high\_risk\_country \rightarrow large\_withdrawal$$

$$large\_withdrawal, international\_transfer \rightarrow high\_risk\_country$$

In some embodiments, candidate rule generation or determination may include or involve using parsing or processing tools to create data items or objects (which may be or may include for example pointers to a database) and store these objects separately, e.g., from the database of event or data transfer data (to which they may point or refer). In some embodiments, policy management tools may be used to write strategy rules, e.g., to generate alerts.

Step 3: calculating metrics for each rule. For example, for a rule such as e.g. large_withdrawal and high_risk_country leading to an international_transfer, some embodiments may determine or calculate, e.g., based on a dataset of event data or computer operation data (which may for example include both order sensitive and order insensitive sequences of events, or a partial dataset including, e.g., only one or more categories of events):

$$Rule: large\_withdrawal, high\_risk\_country \rightarrow international\_transfer \quad (eq.\ 9)$$

$$Support(large\_withdrawal, high\_risk\_country, international\_transfer) =$$

$$2/5 = 0.4$$

$$Confidence(large\_withdrawal, high\_risk\_country \rightarrow$$

$$international\_transfer) =$$

$$Support(large\_withdrawal, high\_risk\_country, international\_transfer)/$$

$$Support(large\_withdrawal, high\_risk\_country = 0.4/0.6 = 0.67$$

$$Lift(large\_withdrawal, high\_risk\_country \rightarrow international\_transfer) =$$

$$Confidence(large\_withdrawal, high\_risk\_country \rightarrow international\_transfer)/$$

$$Support(international\_transfer) = 0.67/0.6 = 1.12$$

Step 4: applying thresholds and selecting rules. In some embodiments, rules may be selected using pre-defined thresholds, e.g., for support and lift values calculated for "Fraud"/"Legit" labeled data transfers or transac- $$(eq.\ 7)$$

tions. This may be done, for example by comparing values calculated for fraudulent transactions associated with a given sequences sequence with values for the remaining population, e.g., of non-fraudulent data transfers or transactions. For example, for a sequence S1, given that Lift (S1, fraud)=1.12, and Lift (S1, legit)=0.8, and a threshold T=0.3, since Lift (S1, legit)−Lift (S1, fraud)>0.3-a rule may be generated indicating that the sequence S1 may be associated with fraud. Some embodiments may apply or use a combination of different thresholds, conditions, or criteria, for rule generation or selection. For example, based on thresholds such as, e.g.:

$$Support > 0.3 \quad (eq.\ 10)$$

$$Confidence > 0.6$$

$$Lift > 1.0$$

Some embodiments may check, for a given rule, whether calculated metrics or scores (e.g., for data transfer or transactions including the sequence or rule and labeled as fraudulent) meet the thresholds (as may be done, e.g., for differences between metrics for transactions labeled as fraudulent and ones labeled as legit). For example, for the example rule considered herein:

large_withdrawal, high_risk_country → international_transfer:  (eq. 11)

Support: 0.4 (larger than 0.3; therefore meets threshold)

Confidence: 0.67 (larger than 0.6; therefore meets threshold)

Lift: 1.12 (larger than 1.0; therefore meets threshold)

If all thresholds are met or are exceeded, some embodiments may select rule for which metrics are calculated.

Step 5: translate selected rules to operational, strategy alerting rules, or to new integrated fraud management (IFM) attributes, such as for example:

large_withdrawal AND high_risk_country AND  (eq. 12)

international_transfer à Alert

In other words, some example embodiments may search a database of events (such as for example computerized transactions associated a given user or a group of users) and calculate relevant scores or metrics (such as for example, support, confidence, and lift) for the pattern or subsequence of events specified in the rule or candidate (e.g., for transactions labeled as fraudulent as well as for transactions labeled as legitimate or nonfraudulent). If the metrics (or differences in metrics or values) exceed relevant predetermined thresholds or satisfy relevant predetermined conditions or criteria, some embodiments may select and apply the rule, e.g., to perform automated actions such as for example sending or transmitting an alert or notification to a remote computer (e.g., upon receiving data describing a new transaction or data transfer which includes events or actions as specified in the rule), or transmitting data describing the rule or strategy rule itself which may be used by a remote computer system (e.g., when analyzing a different dataset to detect fraudulent data transfers or transactions). Otherwise, if thresholds or values are not met based on the dataset of event data, embodiments may not select or apply the relevant rule, and may not perform any corrective automated action based on the corresponding patterns or sequences. In some embodiments, the searching and calculating of scores or metrics based on event data may be performed in response to a newly executed event or computerized transaction: for example, after an action or event such as for example cash withdrawal is added to or documented in the database, some embodiments may calculate the relevant metrics and perform automated actions accordingly.

Additional or alternative steps and/or conditions and criteria may be used as part of a FP-Growth based pattern extraction and rule generation procedure according to different embodiments.

Analogously, an example pattern extraction and rule generation process—e.g., for order sensitive sequences-according to some embodiments may include, for example:

Step 1: identifying or determining frequent subsequences or patterns using, e.g., the PrefixSpan data mining algorithm. For a dataset of sequences S of events such as for example:

$S1$:                                                                    (eq. 13)

{large_withdrawal → international_transfer → high_risk_country}

$S2$: {large_withdrawal → high_risk_country}

$S3$: {international_transfer → high_risk_country}

$S4$: {large_withdrawal → international_transfer}

$S5$: {large_withdrawal → international_transfer → high_risk_country}

Some embodiments may calculate support values for subsequences, and determine frequent subsequences using support values, e.g., using PrefixSpan:

{large_withdrawal → high_risk_country} with support $3/5 = 0.6$  (eq. 14)

{international_transfer → high_risk_country} with support $3/5 = 0.6$

{large_withdrawal → international_transfer} with support $4/5 = 0.8$

{large_withdrawal → international_transfer → high_risk_country} with support $2/5 = 0.4$

Step 2: generating, determining or computing candidate sequential rules. In some embodiments, rules may be determined or computer using one or more of the identified subsequences or patterns. For example, using the frequent sequential pattern {large_withdrawal→international_transfer→high_risk_country}, some embodiments may generate candidate sequential rules such as, e.g.:

large_withdrawal → international_transfer  (eq. 15)

large_withdrawal → high_risk_country international_transfer → high_risk_country large_withdrawal → international_transfer → high_risk_country Step 3: calculating metrics for each rule. For example, for a rule such as e.g. large_withdrawal followed by international_transfer followed by high_risk_country, some embodiments may calculate or determine, e.g., based on a dataset of event data (which may for example include both order sensitive and order insensitive sequences of events, or a partial dataset including, e.g., only one or more categories of events):

Rule: large_withdrawal →  (eq. 16)

international_transfer → high_risk_country

Support(large_withdrawal → international_transfer → high_risk_country) =

$2/5 = .04$

Confidence(large_withdrawal → international_transfer → high_risk_country) =

Support(large_withdrawal → international_transfer → high_risk_country)/

Support(large_withdrawal → international_transfer) = $0.4/0.8 = 0.5$

-continued $$\text{Lift(large\_withdrawal} \rightarrow \text{international\_transfer} \rightarrow \text{high\_risk\_country)} =$$

$$\text{Confidence(large\_withdrawal} \rightarrow \text{international\_transfer} \rightarrow$$

$$\text{high\_risk\_country)/Support(high\_risk\_country)} = 0.5/0.6 = 0.83$$

Step 4: Applying thresholds and selecting strong rules (which may be done, in some embodiments, in a manner analogous or similar to the process or procedure described with regard to rule generation using the FP-Growth algorithm). Based on thresholds such as, e.g.:

$$\text{Support} > 0.3 \qquad \text{(eq. 17)}$$

$$\text{Confidence} > 0.4 \text{ (which may be, e.g., a lowered value determined for}$$

$$\text{higher complexity of sequence)}$$

$$\text{Lift} > 1.0$$

some embodiments may check, for a given rule, whether calculated metrics or scores meet the thresholds. As a nonlimiting example, for the example rule considered herein:

$$\text{large\_withdrawal} \rightarrow \text{international\_transfer} \rightarrow \text{high\_risk\_country:} \quad \text{(eq. 18)}$$

$$\text{Support: 0.4 (larger than 0.3; therefore meets threshold)}$$

$$\text{Confidence: 0.5 (larger than 0.4; therefore meets threshold)}$$

$$\text{Lift: 0.83 (smaller than 0.3; therefore does not meet threshold)}$$

Since the Lift parameter does not meet the threshold, some embodiments may not select the corresponding rule and for example proceed to process this rule in the next steps. Some embodiments may for example consider a simpler or partial rule including some steps from the rule that has not been selected, such as, e.g. large_withdrawal→international_transfer, for which the following parameters may, e.g. be calculated by some embodiments:

$$\text{large\_withdrawal} \rightarrow \text{international\_transfer:} \qquad \text{(eq. 19)}$$

$$\text{Support: } 4/5 = 0.8 \text{ (meets threshold)}$$

$$\text{Confidence: } 0.8/1.0 = 0.8 \text{ (meets threshold)}$$

$$\text{Lift: } 0.8/0.8 = 1 \text{ (meets threshold)}$$

Since all parameters calculated for the partial or simpler rule meet the relevant thresholds, some embodiments may select the partial or simpler rule and use or include it as an input for next steps. Additional or alternative thresholds and their combination, as well as conditions and criteria (including, e.g., comparing scores or metric values for data transfers or transactions labeled as fraudulent with ones labeled as legitimate) may be used in different embodiments.

Step 5: Writing the rule in logical notation, such as for example:

$$\text{large\_withdrawal AND international\_transfer à Alert} \qquad \text{(eq. 20)}$$

In other words, some example embodiments may search a database of events (such as for example computerized transactions associated a given user or a group of users) and calculate relevant scores or metrics (such as for example, support, confidence, and lift) for the pattern or subsequence of events specified in the rule (e.g., for transactions labeled as fraudulent as well as for transactions labeled as legitimate or nonfraudulent). If the metrics (or differences in metrics or values) exceed relevant predetermined thresholds or satisfy relevant predetermined conditions or criteria some embodiments may select and apply the rule, e.g., to perform automated actions. Otherwise some embodiments may not select or apply the relevant rule, and may not take any corrective action.

Additional or alternative steps and/or conditions and criteria may be used as part of a PrefixSpan based pattern extraction and rule generation procedure according to different embodiments.

Rule Evaluation Scoring 712 and Rule Selection 714

Some embodiments may calculate metrics for each rule. For example, for the rule: {Login Attempt, Password Change}→{High-Value Transfer}, some embodiments may calculate the following nonlimiting example metrics, e.g. using a database of event data:

Support: 0.05 (5% of sequences may contain this pattern)

Confidence: 0.80 (80% likelihood that a high-value transfer may follow the login attempt and password change)

Lift: 1.5 (may indicate the rule may be 1.5 times more likely than random occurrence)

Risk Score: 0.85 (which may be based on historical fraud data and expert input)

Temporal Significance: 0.70 (significant temporal pattern detected)

Category Significance: 0.90 (high-risk event types involved)

Some scores or metrics such as for example risk scores, temporal significance, and category significance may be for example received from an element or component of policy manager rules 716, which may for example be integrated into various fraud management solutions 718. Various additional or alternative scores or metrics may be included or used in different embodiments.

Some embodiments may include selecting one or more of the logical rules based on weighting one or more metrics, wherein the metrics comprise a risk score. In some embodiments, the one or more logical rules applied to the data transfer comprise the selected rules.

Some embodiments may for example weight metrics or scores and/or assign weights to metrics based on importance, such as for example:

$$w1 = 0.2 \text{ (assigned to Support)}$$

$$w2 = 0.2 \text{ (assigned to Confidence)}$$

$$w3 = 0.1 \text{ (assigned to Lift)}$$

$$w4 = 0.3 \text{ (assigned to Risk Score)}$$

$$w5 = 0.1 \text{ (assigned to Temporal Significance)}$$

$$w6 = 0.1 \text{ (assigned to Category Significance)}$$

Some embodiments may normalize metrics or scores, for example to a scale of 0 to 1, and may aggregate scores and/or calculate an overall relevance score for a given rule using weighted scores or metrics, such as for example:

$$\text{Relevance Score} = 0.2 \cdot 0.05 + 0.2 \cdot 0.80 + \quad\quad\quad (\text{eq. 21})$$
$$0.1 \cdot 1.5 + 0.3 \cdot 0.85 + 0.1 \cdot 0.70 + 0.1 \cdot 0.90 = 7.35$$

An association or logical rule may be ranked based on its relevance score (0.735), and embodiments may select rules based on weighted scores or metrics-such as for example the association rules or logical rules with the highest relevance scores—to be applied to event data or an incoming data transfer, for implementation, alert generation, and performing appropriate automated actions.

Some embodiments may calculate risk scores and/or relevancy scores such as, e.g.:

$$\text{Risk Score} = \quad\quad\quad (\text{eq. 22})$$
$$wS \cdot norm(S) + wC \cdot norm(C) + wL \cdot norm(L) + wTS \cdot norm(TS) +$$
$$wCS \cdot norm(CS) + wHFC \cdot norm(HFC) + wEK \cdot norm(EK)$$

$$\text{Relevance Score} = wS \cdot norm(S) + wC \cdot norm(C) + wL \cdot norm(L) + \quad (\text{eq. 23})$$
$$wRS \cdot norm(RS) + wTS \cdot norm(TS) + wCS \cdot norm(CS)$$

Where S=Support, C=Confidence, L=Lift, RS=Risk score, TS=Temporal significance, CS-Category significance, where wX denotes the weight or coefficient determined for metric X, and where norm denotes a normalized metric (e.g., with a value between 0-1). A risk score according to some embodiments may include the Historical Fraud Correlation (HFC) and Expert Knowledge (EK) factors, which are specifically related to the potential risk associated with the pattern based on historical data (which may for example be determined using machine learning and/or neural network components and/or techniques and, e.g., using appropriate labeled datasets) as well as expert insights and/or predefined conditions or criteria.

A relevance score according to some embodiments may include the Risk Score (RS) itself as one of the components, which is already a composite measure of several factors. This score evaluates the practical applicability and overall importance of the rule in the context of fraud detection.

According to some embodiments, a risk score may focus on assessing the threat level of a pattern using detailed risk-related factors, while a relevance score may provide a broader evaluation incorporating the risk score and other contextual factors to determine the overall applicability of a rule. Rule scoring or weighting of scores or metric values may be used, inter alia, in different operations such as for example described herein, including, e.g., as part of data mining and/or rule generation processes or procedures. Various additional or alternative scores or metrics may be calculated and used by different embodiments of the invention.

According to some embodiments, rules may be applied to generate alerts (e.g., in element 720). For instance, an example rule may be: if a Domestic_Transfer event exist (e.g., in a sequence of events), AND if the following sequence of events took place before and within 3 days from transfer: {Login_Attempts, Password_Change, Add_New_Beneficiary, Self_Transfer}, then generate and/or send or transmit an alert. According to some embodiments, alerts may be, e.g., in JavaScript object notation (JSON) format or in text format, and may include details about the relevant data transfer or transaction, such as for example action or event codes or identifiers, timestamps, calculated metrics, and the like, as well as commands for automated actions such as for example to automatically deny, reject, or reverse the transfer or transaction. Additional or alternative alerts and alert formats may be used in different embodiments of the invention.

Alert or rule assessment 722, may be a step that may be responsible for evaluating alerts generated by applying generated and/or selected rules to financial transaction data, and/or determining appropriate actions for each rule or alert. The input to this component may be or may include alerts generated by applying selected rules to transaction data (such as for example received data transfers or transactions added to a database or dataset of data transfer or transaction data). Each alert or rule may include an effectiveness or a suspicion level based on evaluation criteria, which may include calculating and/or comparing various scores or matric values such as, e.g., risk and relevance scores. In some embodiments, a rule or alert assessment may include calculating a false positives ratio (FPR)—for example tween false alarms (which may be for example legitimate or nonfraudulent data transfers or transactions which were delayed or decline, or for which alerts were generated, using a given rule) and "true" alarms (which may be e.g. fraudulent or potentially fraudulent data transfers or transactions which were delayed or decline, or for which alerts were generated, using the rule):

$$FPR = \text{False Alerts} / \text{True Alerts} \quad\quad (\text{eq. 24})$$

In some embodiments, alerts may be classified, categorized or labeled as false or true following the applying or a given rule, and may be performed, e.g., in response to user feedback (such as for example an SME, system administrator or a user owning the account by which transactions were performed). In case the FPR value for a given rule is higher than a predetermined threshold or value, such as, e.g., 0.5—some embodiments may discard or delete the rule and may not apply it to additional transactions or data transfers. Otherwise, embodiments may continue to apply the rule and perform automated actions accordingly. In some embodiments, alert or rule assessment may be performed, e.g., once in a predetermined time period, e.g., every 2 hours, or upon initiating the assessment process by a user or system administrator—to discard undesirable rules and to prevent applying rules and performing unnecessary automated actions (such as, e.g., sending false alerts). Additional or alternative assessment procedures may be used in different embodiments.

The output of this component may be a set of assessed alerts with recommended actions, such as for example blocking data transfers or transactions, issuing/sending/transmitting proactive notifications, approving transactions, and the like. In some embodiments, automated actions may be determined based on the suspicion level and the context of each alert.

Some embodiments may include accepting or denying a data transfer based on applying one or more logical rules to the data transfer, the rules determined using one or more of the identified subsequences.

In some embodiments of the invention, alert assessment may include, for example:

Alert evaluation: each alert generated using a given association rule or logical rule may be evaluated to determine its suspicion level. This may involve, in some embodiments, analyzing the risk and relevance scores associated with or calculated for the alert and/or rule and considering additional context such as the transaction history, past behavior of the accounts involved, and other relevant factors, conditions, or criteria.

Action determination: based on the suspicion level, the system may determine appropriate automated actions for each alert. Some nonlimiting example actions are categorized as follows:

Block data transfer 724: if the suspicion level of an alert exceeds a predefined threshold (e.g., of T>0.9), a given data transfer or transaction may be rejected, denied, or blocked to prevent potential fraud.

Proactive notification 726: for example, sequences containing, e.g., only a specific type of events (such as for example non-monetary events) and for which a suspicion level is high (e.g., above a threshold of T>0.8), a notification or alert describing relevant data transfer may be sent or transmitted to a remote computer regarding, for example, suspected future fraud. In some embodiments, the notification or alert may be sent or transmitted over a communication or data network.

Approve data transfer 728: if the suspicion level of an alert is below the threshold (e.g., of T<0.8), the data transfer or transaction may be approved and processed normally.

Contextual Analysis: this step may involve a deeper analysis of a context of a given data transfer to ensure that the recommended action is appropriate. This may include, for example, searching and/or analyzing patterns of past transactions, the typical behavior of a relevant account or user, and any anomalies that may be indicative of fraud.

Additional or alternative thresholds and/or conditions or criteria for determining automated actions for alerts may be used in different embodiments.

Embodiments may thus assess or evaluate rules and/or alerts and determine appropriate automated actions based on a comprehensive evaluation of risk and relevance scores, combined with contextual or pattern extraction analysis. This may ensure that the actions performed or taken are both precise and appropriate, reducing the likelihood of false positives and negatives compared to, e.g., previous alert generation frameworks.

For example, based on rules determined using mined event subsequences as well as corresponding assessed alerts, some embodiments may receive a request for an incoming data transfer or transaction (such as for example a request for a cash withdrawal, following an international transfer). Based on the relevant rule (such as, e.g., (international transfer)→(cash withdrawal)), and automated actions determined for the rule (such as, e.g., accept/deny transaction) and corresponding alert, embodiments may, e.g., approve/accept or deny/block the data transfer, and/or send proactive notifications to a remote computer (which may for example be operated by a security officer or system administrator), notifying or potentially risk or fraudulent activities.

In some embodiments, a system such as for example a computerized server (which may be, e.g., system 220) may run or execute some or all of the operations or protocols described herein (including, e.g., data processing and mining, generating rules, analyzing incoming data transfers or transactions recorded or documented in a corresponding database, and the like) and may send a computerized command to a transaction server (e.g., a banking server which may be, e.g., system 210)—for example block a computerized transaction. The computerized command or request may be transferred, for example, using a network packet protocol (such as for example the transport layer security (TLS) protocol) and/or by communicating a secure message or application programming interface (API) call containing the transaction details and a specific flag or status code indicating the rejection or blocking decision or action. Additional or alternative protocols for sending computerized requests and commands for performing automated actions may be used in different embodiments.

Some embodiments of the invention may improve the technology of detecting patterns in computer actions and taking action based on those patterns. Some embodiments of the invention may improve financial crime detection technologies, where accurate and timely alert assessment may be critical for preventing fraud. By classifying and categorizing events and sequences of events, some embodiments may make more robust automated decisions or determinations, enhancing the overall effectiveness of the fraud detection process, and leading to more reliable outcomes.

Some embodiments may be applied to diverse datasets including various sources of data or information, including but not limited to event data describing financial transactions as well as other, non-finance events such as regulatory events, environmental events, and the like. By incorporating a wide range of event types, some embodiments may provide a thorough and nuanced analysis of, e.g., potential fraud patterns, which may improve or enhance the overall effectiveness and robustness of existing fraud detection systems and technologies.

Some embodiments of the invention may improve suspicious event and/or fraud detection technologies, e.g., by automatically determining rules for identifying suspicious events, or narrowing the search space for such rules, without having to manually define or specify such rules based exclusively on pre-known suspicious activities. Unlike traditional methods that focus on providing predefined rules that are assumed to describe or be associates with specific, historical suspicious activities-some embodiments may be used for analyzing large volumes of data using advanced pattern mining techniques, while taking the sequence of events leading up to a given data transfer or transaction event into consideration. This may allow for a deeper understanding of suspicious or fraudulent behaviors and may enable proactive fraud detection (for example of fraudulent activities which may be different from past activities and may not be described using predefined conditions or criteria relating specifically to a specific event, data transfer or transaction). The use of advanced pattern mining tools and techniques such as, e.g., FP-Growth and PrefixSpan to mine sequential patterns may allow to handle large datasets in a computationally economical and efficient manner, making some embodiments particularly used for real-time suspicious event and fraud detection applications.

Some embodiments may include a seamless integration mechanism that may automatically convert identified patterns into actionable rules, which may allow for example to perform automated computer actions such as for example accepting or denying a data transfer. Some embodiments may be integrated with additional systems and may deploy actionable rules and enhance suspicious activity or fraud detection and prevention capabilities without extensive manual intervention. Some embodiments improve fraud detection technology by using machine learning tools and techniques for analyzing the temporal order and interdependencies of different events, which allows for identifying subtle but significant patterns that may indicate fraud-which may not be considered using existing and/or traditional solutions.

FIG. 8 is a flow diagram describing an example method for analyzing data transfers using pattern mining according to some embodiments of the invention. In operation 810, some embodiments may categorize sequences of events into one or more categories (such as for example an order sensitive category and an order insensitive category) based on an order of the events in the sequences. Embodiments may identify, for one or more sequences in a given category, one or more subsequences of events in a dataset of event data (which may for example subsequences appearing frequently in the dataset)—using one or more pattern mining algorithms (such as for example the FP-Growth algorithm, which may be applied to or used for order insensitive sequences, and the PrefixSpan algorithm, which may be applied to or used for order insensitive sequences; operation 820). Embodiments may accept or deny a data transfer based on applying one or more logical rules to the data transfer, where the rules may be determined using one or more of the identified subsequences (e.g., using association rules learning; operation 830).

Additional or alternative operations may be included in different embodiments of the invention.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized method for performing data transfers using pattern mining, the computerized method comprising, using one or more computer processors:

categorizing one or more sequences of events into one or more categories, the categorizing based on an order of the events in one or more of the sequences, wherein the one or more categories comprise an order sensitive category and an order insensitive category;

for one or more sequences in a given category, identifying, using one or more data mining algorithms, one or more subsequences of events in a dataset of event data, wherein the identifying of the one or more subsequences of events comprises applying a first data mining algorithm to the one or more sequences in the order sensitive category, wherein the first data mining algorithm comprises recursively projecting the dataset of event data based on prefixes of the one or more of the sequences, and applying a second data mining algorithm to the one or more sequences in the order insensitive category, wherein the second data mining algorithm comprises:

constructing a tree data structure which represents the dataset of event data; and generating one or more of the subsequences by recursively mining the tree data structure; and blocking or approving a data transfer over a communication network based on applying one or more logical rules to the data transfer, the one or more logical rules determined using one or more of the identified subsequences.

2. The computerized method of claim 1, wherein the one or more logical rules are determined based on a correlation between a first event in a subsequence and a second event in a subsequence, the correlation calculated using the dataset of event data.

3. The computerized method of claim 2, wherein the correlation is calculated using a ratio between a number of the one or more sequences including the first event and the second event, and a number of one or more sequences including only the first event multiplied by the number of the one or more sequences including only the second event.

4. The computerized method of claim 1, comprising transmitting an alert to a remote computer over a communication network, the alert describing the data transfer.

5. The computerized method of claim 1, wherein at least one of the events comprises a computer action, the computer action performed over a communication network and recorded in the dataset of event data.

6. The computerized method of claim 1, comprising selecting one or more of the one or more logical rules based on weighting one or more metrics, wherein the metrics comprise a risk score; and wherein the one or more logical rules applied to the data transfer comprise the one or more selected rules.

7. A computerized system for performing data transfers using pattern mining, the computerized system comprising:

a memory; and one or more computer processors configured to:

categorize one or more sequences of events into one or more categories, the categorizing based on an order of the events in one or more of the sequences, wherein the one or more categories comprise an order sensitive category and an order insensitive category;

identify, for one or more sequences in a given category, one or more subsequences of events in a dataset of event data, the identifying using one or more data mining algorithms, wherein the identifying of the one or more subsequences of events comprises applying a first data mining algorithm to the one or more sequences in the order sensitive category, wherein the first data mining algorithm comprises recursively projecting the dataset of event data based on prefixes of the one or more of the sequences, and applying a second data mining algorithm to the one or more sequences in the order insensitive category, wherein the second data mining algorithm comprises:

constructing a tree data structure which represents the dataset of event data; and generating one or more of the subsequences by recursively mining the tree data structure; and block or approve a data transfer over a communication network based on applying one or more logical rules to the data transfer, the one or more logical rules determined using one or more of the identified subsequences.

8. The computerized system of claim 7, wherein the one or more logical rules are determined based on a correlation between a first event in a subsequence and a second or more events in a subsequence, the correlation calculated using the dataset of event data.

9. The computerized system of claim 8, wherein the correlation is calculated using a ratio between a number of the one or more sequences including the first subsequence and the second subsequence, and a number of one or more sequences including only the first subsequence multiplied by the number of one or more sequences including only the second subsequence.

10. The computerized system of claim 7, comprising transmitting an alert to a remote computer over a communication network, the alert describing the data transfer.

11. The computerized system of claim 7, wherein at least one of the events comprises a computer action, the computer action performed over a communication network and recorded in the dataset of event data.

12. The computerized system of claim 7, wherein one or more of the processors are to select one or more of the one or more logical rules based on weighting one or more metrics, wherein the metrics comprise a risk score; and wherein the one or more logical rules applied to the data transfer comprise the one or more selected rules.

13. A computerized method for performing data transfers using pattern mining, the computerized method comprising, using one or more computer processors:

grouping one or more sequences of computer operations into one or more groups, the grouping based on an order of the operations in one or more of the sequences, wherein the one or more groups comprise an order sensitive group and an order insensitive group;

for one or more sequences in a given group, determining, using one or more pattern mining algorithms, one or more patterns of operations in a dataset of computer operation data, wherein the determining of the one or more patterns of operations comprises applying a first pattern mining algorithm to the one or more sequences in the order sensitive group, wherein the first pattern mining algorithm comprises recursively projecting the dataset of computer operation data based on prefixes of the one or more of the sequences, and applying a second pattern mining algorithm to the one or more sequences in the order insensitive group, wherein the second pattern mining algorithm comprises:

constructing a tree data structure which represents the dataset of computer operation data; and generating one or more of the patterns of operations by recursively mining the tree data structure; and blocking or approving a data transfer over a communication network based on applying one or more association rules to the data transfer, the one or more logical rules computed using one or more of the determined patterns.

14. The computerized method of claim 13, wherein one or more of the association rules are computed based on a correlation between a first operation in a given pattern and a second operation in the given pattern, the correlation calculated using the dataset of computer operation data.

15. The computerized method of claim 13, comprising sending a notification to a remote computer over a data network, the notification describing the data transfer.

16. The computerized method of claim 13, wherein at least one of the operations comprises a computer action, the computer action performed over a data network and documented in the dataset of event data.

17. The computerized method of claim 13, comprising selecting one or more of the one or more association rules based on weighting one or more scores, wherein the scores comprise a risk score; and wherein the one or more association rules applied to the data transfer comprise the one or more selected rules.

* * * * *